United States Patent [19]
Curley et al.

[11] Patent Number: 5,687,250
[45] Date of Patent: Nov. 11, 1997

[54] IMAGE QUALITY ANALYSIS METHOD AND APPARATUS

[75] Inventors: Craig Dennis Curley; Thomas Chester Smith; Filip Jay Yeskel, all of Charlotte, N.C.

[73] Assignee: International Business Machines Corporation, Armon, N.Y.

[21] Appl. No.: 371,938

[22] Filed: Jan. 12, 1995

Related U.S. Application Data

[63] Continuation of Ser. No. 195,728, Feb. 14, 1994, abandoned.
[51] Int. Cl.$^6$ ............... G06K 9/00; G06K 9/03
[52] U.S. Cl. .............. 382/112; 382/155; 382/309
[58] Field of Search .................. 382/155, 112, 382/141, 309, 311, 305; 364/552

[56] References Cited

U.S. PATENT DOCUMENTS

| | | | |
|---|---|---|---|
| 4,383,275 | 5/1983 | Sasaki et al. | 382/65 |
| 4,853,882 | 8/1989 | Marshall | 364/570 |
| 4,888,812 | 12/1989 | Dinan et al. | 382/7 |
| 4,903,141 | 2/1990 | Morton | 358/348 |
| 5,144,566 | 9/1992 | Anderson et al. | 364/552 |
| 5,151,948 | 9/1992 | Lyke et al. | 382/57 |
| 5,170,466 | 12/1992 | Rogan et al. | 395/145 |
| 5,187,750 | 2/1993 | Bebera | 382/7 |
| 5,235,654 | 8/1993 | Anderson et al. | 382/61 |
| 5,305,396 | 4/1994 | Betts et al. | 382/36 |
| 5,327,252 | 7/1994 | Tsuruoka et al. | 382/112 |

OTHER PUBLICATIONS

Proceedings of the IEEE Global Telecommunications Conference, Houston, TX; IEEE Press, New York, pp. 692–696, XP 000427899; Naoshi Sato et al., "Facsimile Service Quality Issues and an Objective Evaluation Methodology on Image Quality Degradation", paragraph 5 – paragraph 6.

IEEE International Conference on Communications, Geneva, Switzerland, May 23–26, 1993; IEEE Press, New York; pp. 966–970, XP 000371222; Toshiko Betchaku et al., "Subjective Evaluation Methods of Facsimile Image Quality", in particular, p. 967, paragraph 3.3.

Journal of Electronic Imaging, vol. 2, No. 3, Jul. 1993 US, pp. 174–184, XP 000394876; David L. Lee et al., "Performance of Three Image–Quality Metrics in Ink–Jet Printing of Plain Papers", the whole document.

*Primary Examiner*—Jose L. Couso
*Assistant Examiner*—Matthew C. Bella
*Attorney, Agent, or Firm*—Francis A. Sirr; Kenneth A. Seaman

[57] ABSTRACT

A document imaging system includes means whereby a large number of anomalous condition indicators or flags that define anomalous conditions that may occur as a result of the operation of a document scanner and/or document processor. A computationally efficient subset of flags and flag combinations is defined, and these subsets of flags and flag combinations (system states) are related to a quantitative measure of the quality (degree of suspiciousness) of the related document images, the documents themselves, and units of work that contain a plurality of documents. The machine computation of quality is compared to a human perception of quality, and computational input parameters are adjusted to improve the match of computational quality to the human quality perception, thus teaching the machine to make proper determinations of image and document quality.

3 Claims, 13 Drawing Sheets

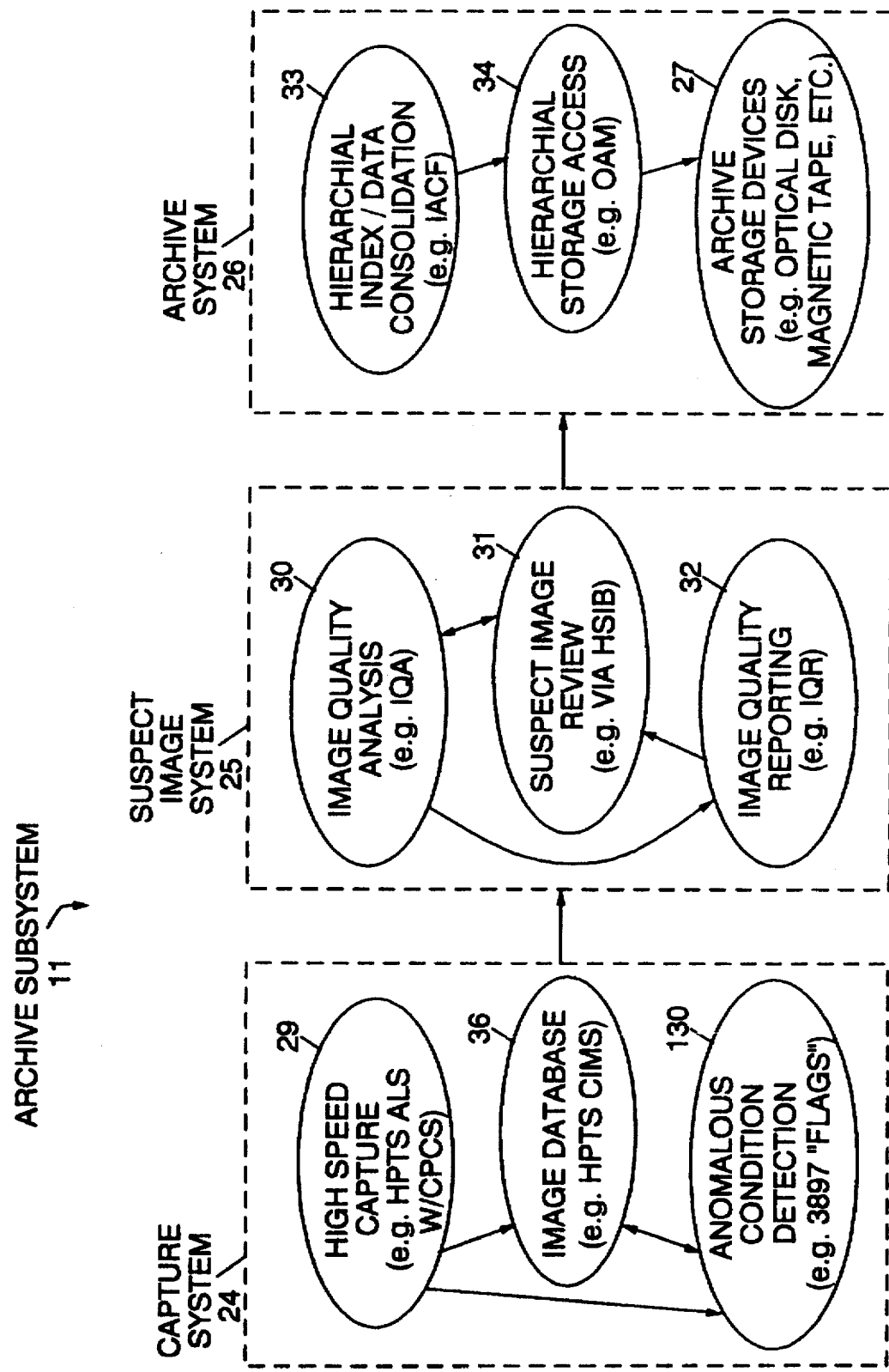

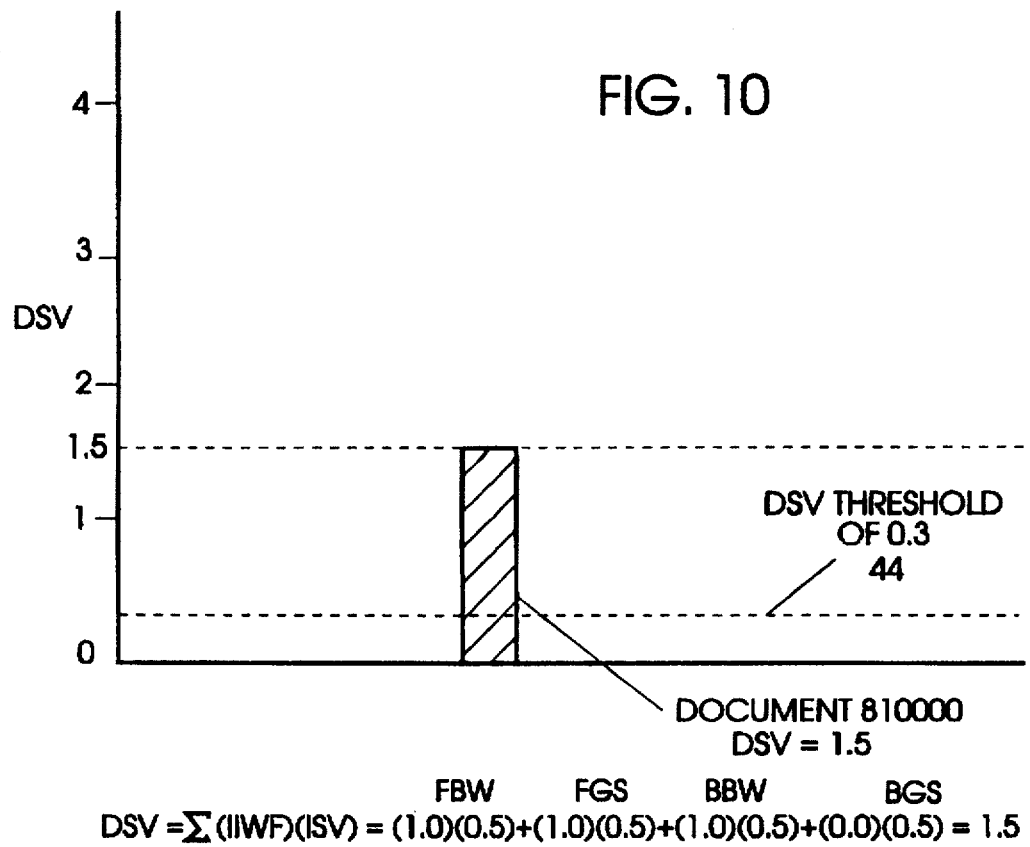
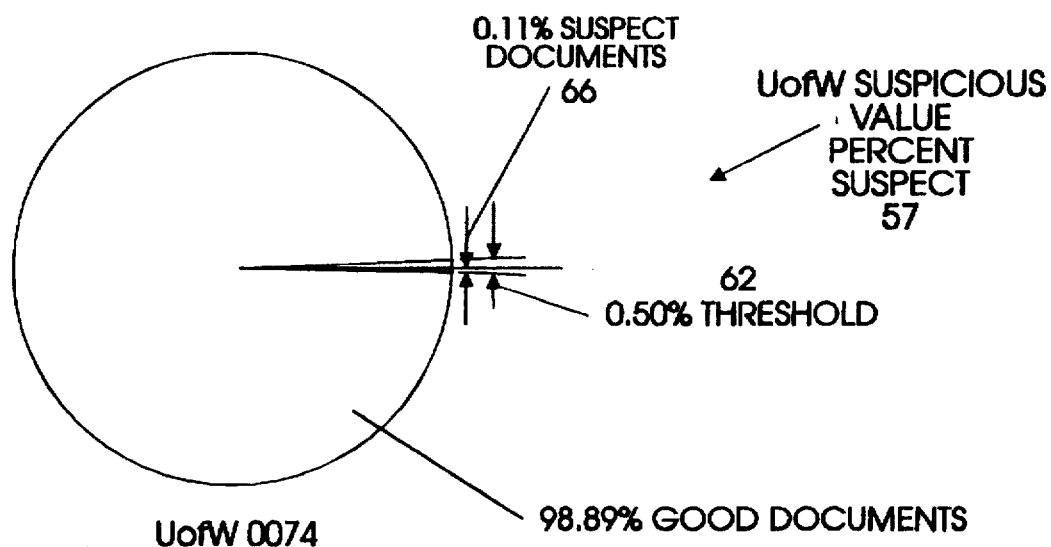

IMAGE QUALITY ANALYSIS METHOD AND APPARATUS

This application is a continuation of application Ser. No. 08/195,728, filed Feb. 14, 1994, now abandoned.

BACKGROUND OF THE INVENTION

1. Field of the Invention

This invention pertains to the field of high speed processing or scanning of documents, such as checks, so as to produce digital images thereof, these images then being stored on mass storage devices for later retrieval. More specifically, the invention pertains to a method and means for providing a quantitative measure of the quality of the digital images.

2. Description of the Prior Art

Machine scanning of documents occasionally results in digital images of poor quality. The present invention is useful in connection with document scanning or imaging systems that include means whereby image quality flags are set to automatically define digital image quality. A very large number of possible flag combinations are typically provided by systems of this type.

In accordance with the invention, computationally efficient subsets of flags (flag combinations, or system states) are operator defined and statistically processed in a manner that provides a quantitative measure of the quality (or degree of suspiciousness) of the images, documents, and Units of Work, UofW, (multiple documents) being analyzed. The computationally derived measure of quality is compared to a human perception of quality, and computational input parameters are adjusted to improve the match between machine defined quality and the human perception of quality.

As used herein, the term flags is not intended to be a limiting term. In general, the term flag relates to the setting of any indicator, parameter, etc., that is indicative of the occurrence of an anomalous condition; i.e., a condition that may be unusual but is not necessarily bad or good. The invention presumes that there is a relationship between certain flags, or flag combinations, and the quality of the image and/or document.

These flags are sometimes called image quality flags or suspect flags. Suspect flags may be set for various anomalous conditions which can occur during machine transport of the document, camera image capture of the document, and subsequent image processing. For example, a camera image may not have passed hardware criteria for image skewing, or a dead image segment; i.e., an all white or black image may have been captured. Another example is a document that is detected to have slowed (or accelerated) during transport (for example, as a result of a jam prior to scanning of the check, thus resulting in a suspect document whose associated images may or may not have been affected by the document's anomalous behavior).

The use of computer-based image processing systems, or architecture to scan documents, such as checks and the like, and to then digitally store the results on mass storage devices is generally known in the art.

U.S. Pat. No. 4,888,812, incorporated herein by reference, discloses such a check processing system that is based upon an IBM 3890 high-speed document reader/sorter. This reader/sorter includes features, such as feeding checks to an image scanner, monitoring image quality and possibly interrupting the process as a result of excessively poor image quality, image data compression, image resolution control, parallel processing of image data, and storage of check images on both high speed and low speed mass storage devices, such as magnetic storage and optical storage.

U.S. Pat. No. 5,170,466, incorporated herein by reference, discloses a storage/retrieval system wherein documents, such as checks, are scanned, digitized, compressed and stored in archival modules. The stored documents can then be retrieved and processed by workstation operators.

U.S. Pat. No. 5,187,750, incorporated herein by reference, discloses a checking account document processing, archival magnetic/optical storage, and printout system having an image capture and image retrieval functions.

The scanning of images with the associated determination of image quality is generally known in the art. Current state-of-the-art imaging systems generally employ human visual checking to ascertain that image quality is acceptable. In high speed and high volume image systems, such as those for imaging checks, human visual image evaluation of every check is impractical.

U.S. Pat. No. 4,383,275, incorporated herein by reference, discloses an optical reader, including CCD sensors, wherein during document reading the sensor outputs are compensated for nonuniformity.

U.S. Pat. No. 4,903,141, incorporated herein by reference, discloses the scanning of microfilm images to produce second generation images, while maintaining the quality of the second generation images. This is done by storing parameters relating to the original image, and then using these stored parameters to generate an adjustment signal that is used to change, or alter, a signal that corresponds to the second generation image.

U.S. Pat. No. 5,144,566, incorporated herein by reference, discloses a print inspection method wherein printed material is optically scanned to determine pixel variable intensity levels. A frequency distribution of these intensity levels is then compared to a reference distribution.

While the prior art, of which the above noted patents are examples, is generally useful for its limited intended purpose, including the detection of anomalous conditions, the need remains in the art for a method and apparatus that provides automated image quality evaluation without human intervention, particularly in the field of high speed and high volume imaging systems. Moreover, the need remains for a method and apparatus that provides a quantitative measure, or numerical ranking, of the relative quality of images and documents that have been identified by a multiplicity of anomalous condition flags. The image quality method and apparatus of the invention provides such an analysis and quantification of image quality, using any of the known image quality detection techniques to generate the anomalous condition flags. More specifically, the need remains for a method and an apparatus that analyzes the image quality flags that are set during document scanning, and which provides a quantitative output; i.e., a number, indicating the degree of suspiciousness of the document, or the UofW containing the document, based upon which flags, or flag combinations, have been set during document scan.

SUMMARY OF THE INVENTION

The image quality analysis method and means of the present invention uses digital flags that have been collected during a machine-implemented document scanning process, and provides a means for relating these multiple digital flags to a quantitative measure of image and document quality.

This invention finds utility in known document imaging systems that include multiple image quality flags. In these known systems, a relatively large number of individual flags are possible, and thus a very large number of flag combinations are possible.

The present invention allows an operator to define computationally efficient subsets of flags and/or flag combinations (i.e., system states). The invention uses statistical techniques to derive therefrom a quantitative measure of the quality, or degree of suspiciousness, of the underlying images, documents, and the UofW, all without human intervention.

As a feature of the invention, the machine derived quantitative measure of image quality is compared to a human operator's perception of image quality, and the machine is taught to properly compute image quality by the operator changing, or adjusting, the machine's computational input parameters to improve the machine/operator image quality match.

The term flags, as used herein, generally mean anomalous condition indicators, these indicators typically comprising a machine-based measurement of some anomalous attribute of the image process. While the invention will be described with reference to binary, i.e., on/off flags, it is contemplated that the flags could be multi-valued in nature in that a set multi-values flag would indicate not only that a threshold has been exceeded, but also the magnitude of the flag would indicate the magnitude of the related condition.

The prior art, of which the IBM 3897 Image Capture Processor (ICP) is an example, detects a number of anomalous conditions that can occur during an image capture process for a document, such as a check. As is well known, devices of this type produce a camera image of a document, such as a check, and then operate to produce one, or more, digital images corresponding to the camera image.

The IBM 3897 detects up to 40 abnormal conditions. These indicators are called suspect flags. Some of these flags apply only to an individual image, some of these flags apply only to operation of the scanner and, thus, potentially apply to more than one document, and some of these flags apply to all of the images associated with a document.

The present invention provides that a human operator specify which flags and/or flag combinations shall be used when making a machine determination of image quality. The invention then uses the state of these flags and/or flag combinations to form a quantitative measure of the degree of suspiciousness of an image, a document, and a UofW.

An object of the invention is to provide an automated method and apparatus for determining the image quality that is provided by a machine based imaging system, the imaging system including means whereby a first plurality of image quality flags are set during operation of the system. A second plurality of a subset of the flags and/or flag combinations are operator defined, and are used to compute a degree of suspiciousness for each image, document and UofW. A pass/fail/conditionally accept decision relative to the UofW is a result of the computing step.

A further object of the invention is to determine the image quality that is provided by a machine based imaging system by defining flag weighting factors for the operator-defined flags/flag combinations, and then determining an Image Suspiciousness Value (ISV) for each image having one or more set flags/flag combinations. This ISV is a function of flag weighting factors that are associated with the set flags/flag combinations.

Document Suspiciousness Values (DSV) are computed using image weighting factors and the computed ISVs that are associated with the document's images.

A number of UofW Suspiciousness Values (USVs) are computed based upon the various DSVs that are associated with the documents in the UofW.

These and other objects and advantages of the invention will be apparent to those of skill in the art upon reference to the following detailed description of the invention, which description makes reference to the drawing.

BRIEF DESCRIPTION OF THE DRAWING

FIG. 2 shows the image archive subsystem of FIG. 1, which archive subsystem includes the invention.

FIG. 10 illustrates the operation of the DSV determination processor shown in FIG. 4.

FIGS. 11–14 illustrate the operation of the USV determination processor of FIG. 4, which processor calculates, for each UofW, an absolute number of suspects USV (absolute USV), a percent suspect USV, an average DSV USV, and a suspect distribution USV.

DESCRIPTION OF THE PREFERRED EMBODIMENT

Figure 1:
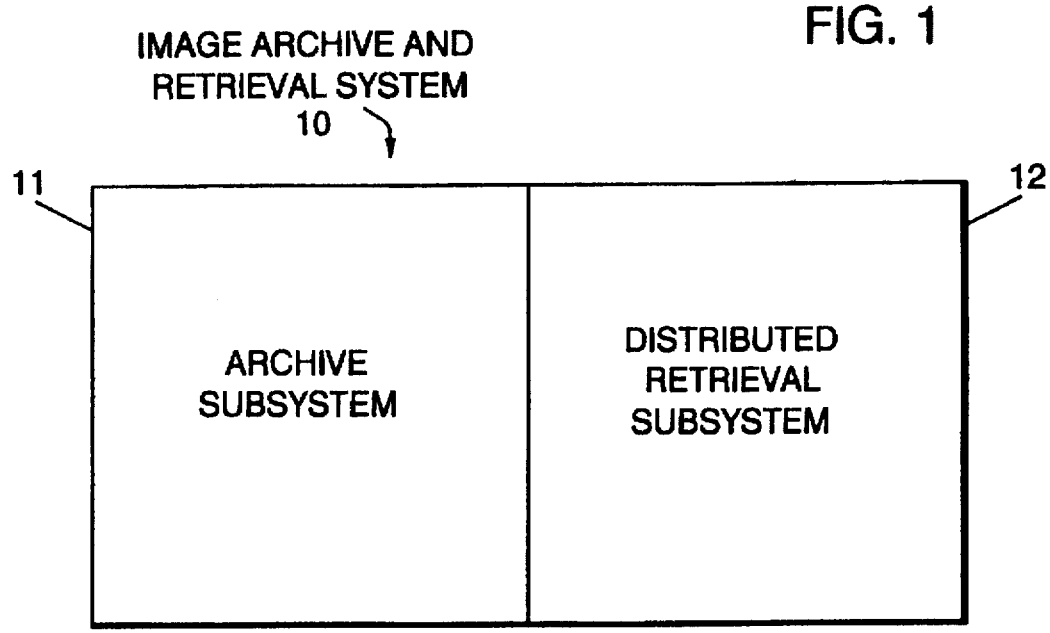
FIG. 1 shows an image archive and retrieval system that includes the invention.

The present invention comprises a part of a larger document archive subsystem, which subsystem in turn comprises a part of a larger image archive and retrieval system. FIG. 1 discloses the general configuration of such an archive/retrieval system 10. The present invention is incorporated within archive subsystem 11.

As the terms are used herein, a document or check comprises the well-known paper, or hard copy, of a document, such as a check. A check contains, for example, printed graphic images and text, alphanumeric data that is usually printed using MICR ink, and handwritten data, such as a signature. The terms image and document image, as used herein, mean one or more digital images, or pictures, of the check. The term coded data, as used herein, generally means the Optical Character Reading (OCR), Magnetic Ink Character Reading (MICR), and the machine reading of handwritten data from a check. The terms associated data or arbitrary associated data, as used herein, generally mean user-defined data that is associated with a check (examples of which are voice annotation data that is provided by an operator at the time of document scanning, and a signature that is taken from a signature card that is associated with the checking account).

With reference to FIG. 2, archive subsystem 11 comprises three major structural components that operate to implement the three processes of (1) image capture, (2) suspect image processing, and (3) image archiving; i.e., capture system 24, suspect image system 25, and archive system 26.

Capture system 24 provides the image capture function for archive subsystem 11, and is implemented by a high speed capture process 29, one embodiment of which is the IBM ImagePlus High Performance Transaction System Application Library Services (HPTS ALS) with the IBM Check Processing Control System (CPCS) by an image database 36, one embodiment of which is the IBM ImagePlus High Performance Transaction System (HPTS) Check Image Management System (CIMS) and by an anomalous condition detection process 130, one embodiment of which is the IBM 3897 that operates to, among other things, detect anomalous conditions and generate anomalous condition flags.

Suspect image system 25 is implemented by Image Quality Analysis (IQA) process 30 of the present invention, a Suspect Image Review (SIR) process 31, and an Image Quality Reporting (IQR) process 32. While IQA 30 of the present invention will be described in relation to the apparatus of FIG. 2, it is to be noted that it is of general utility in any image capture system that generates anomalous condition indicators or suspect flags.

IQA 30 is the subject matter of this application, and is a batch process system that provides automatic identification, analysis, and quantification of suspect document images, documents and UofW.

The Suspect Image Review (SIR) process 31 provides operator review of suspect images at operator workstations. One embodiment is the SIR feature of the IBM HPTS High Speed Image Browse (HSIB) application.

IQR 32 is a batch process system that accumulates data from IQA 30, and generates reports that are based upon this data. IQR 32 also comprises a portion of the present invention.

Archive system 26 is implemented by a hierarchial Index/Data Consolidation Process 33, one embodiment of which is the IBM Image Archive Consolidation Facility, (IACF), a hierarchial Storage Access Process 34, one embodiment of which is the IBM Object Access Method, (OAM), and archive storage devices 27.

Figure 3:
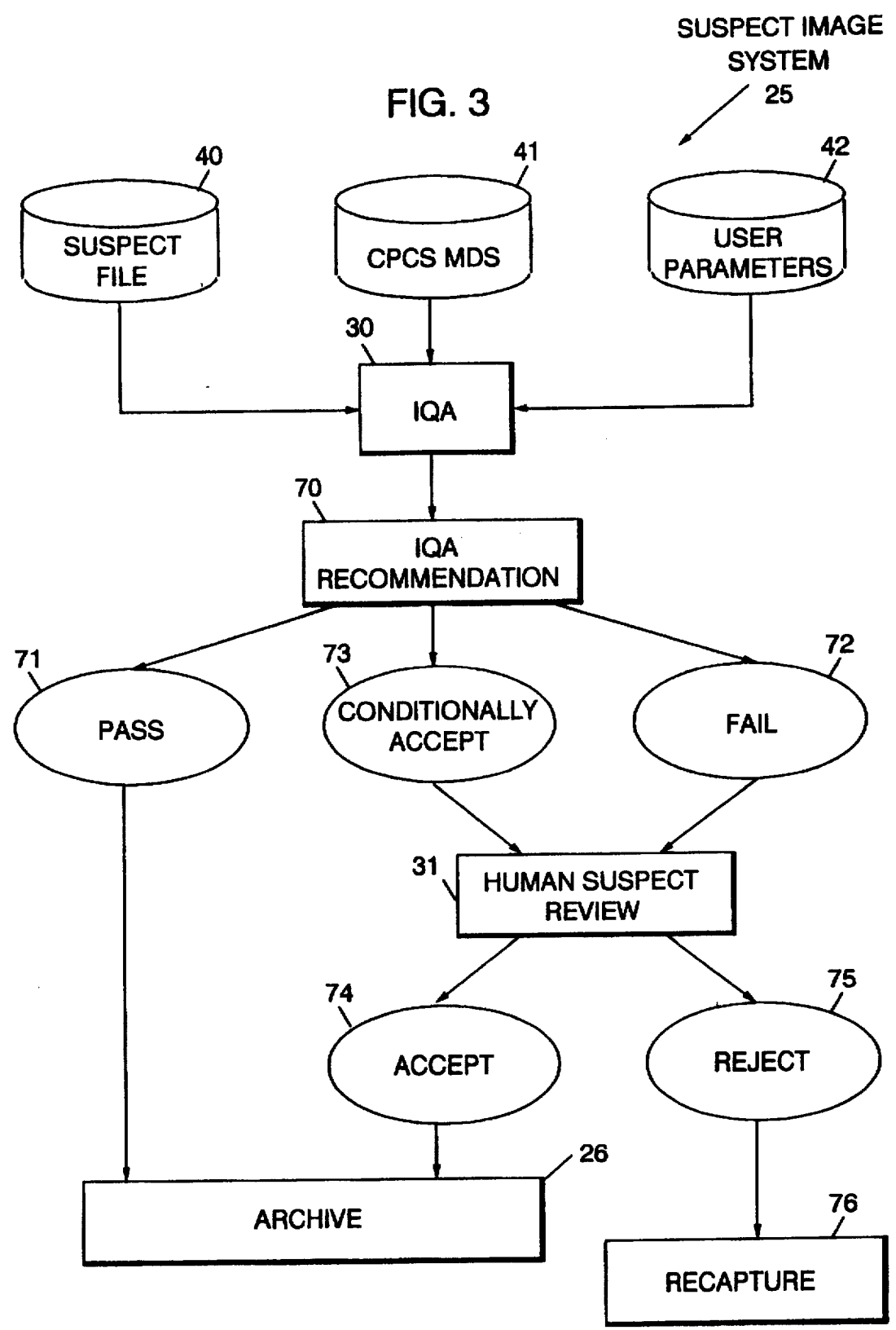
FIG. 3 is a showing of the operation of the IQA apparatus and the SIR apparatus of FIG. 2.

FIG. 3 provides a showing of the operation of IQA 30 and SIR 31 of FIG. 2. In summary, the invention operates to generate an Image Suspiciousness Value (ISV) for each captured image. The ISV for an image is derived from the status of the suspect flags and/or flag combinations that have been set and are relevant to that image, and are assigned a flag combination weighting factor (FCWF, to be described).

The invention further provides a Document Suspiciousness Value (DSV) for each suspect document; i.e., a document having at least one image thereof for which an ISV has been generated. In accordance with the invention, the DSV for a given document is derived from the ISVs that are associated with that document.

Finally, a number of Unit of Work Suspiciousness Values (USVs) are generated for a UofW group of documents in which a DSV has been generated for at least one document of the UofW. Operation of IQA 30 provides a pass/fail/conditionally accept decision 71,72,73 for each UofW based upon a comparison of the generated USVs for that UofW and user parameters 42.

Suspect storage file 40 stores the anomalous indicator information relative to all documents as provided by the image capture device. IQA 30 receives the starting delineation of UofWs from CPCS Mass Data Set (CPCS FEDS) 41 and operates to evaluate the degree of suspiciousness of that UofW based upon information that is received from CPCS MDS 41 and based upon user parameters that are provided at 42.

In accordance with the invention, user parameters 42 can take many forms and, for example, include user defined thresholds, user defined weighting factors, and user defined suspect flags/flag combinations.

IQA 30 operates to provide a recommendation 70 that provides one of three outputs; namely, a pass or proceed with archive recommendation 71, a fail recommendation 72, or a conditionally accept recommendation 73. In the case of both fail recommendation 72 and conditionally accept recommendation 73, provision is made for human review 31 of the suspect images. The result of this human review can be to either accept for archive at 74, or to reject 75 the images. In the case of a reject decision 75, an image recapture function 76 is implemented by capture system 24 of FIG. 2. In the case of a pass recommendation 71 or an accept decision 74 from human suspect review, the UofW proceeds to the archive system 26 of FIG. 2.

Figure 4A:
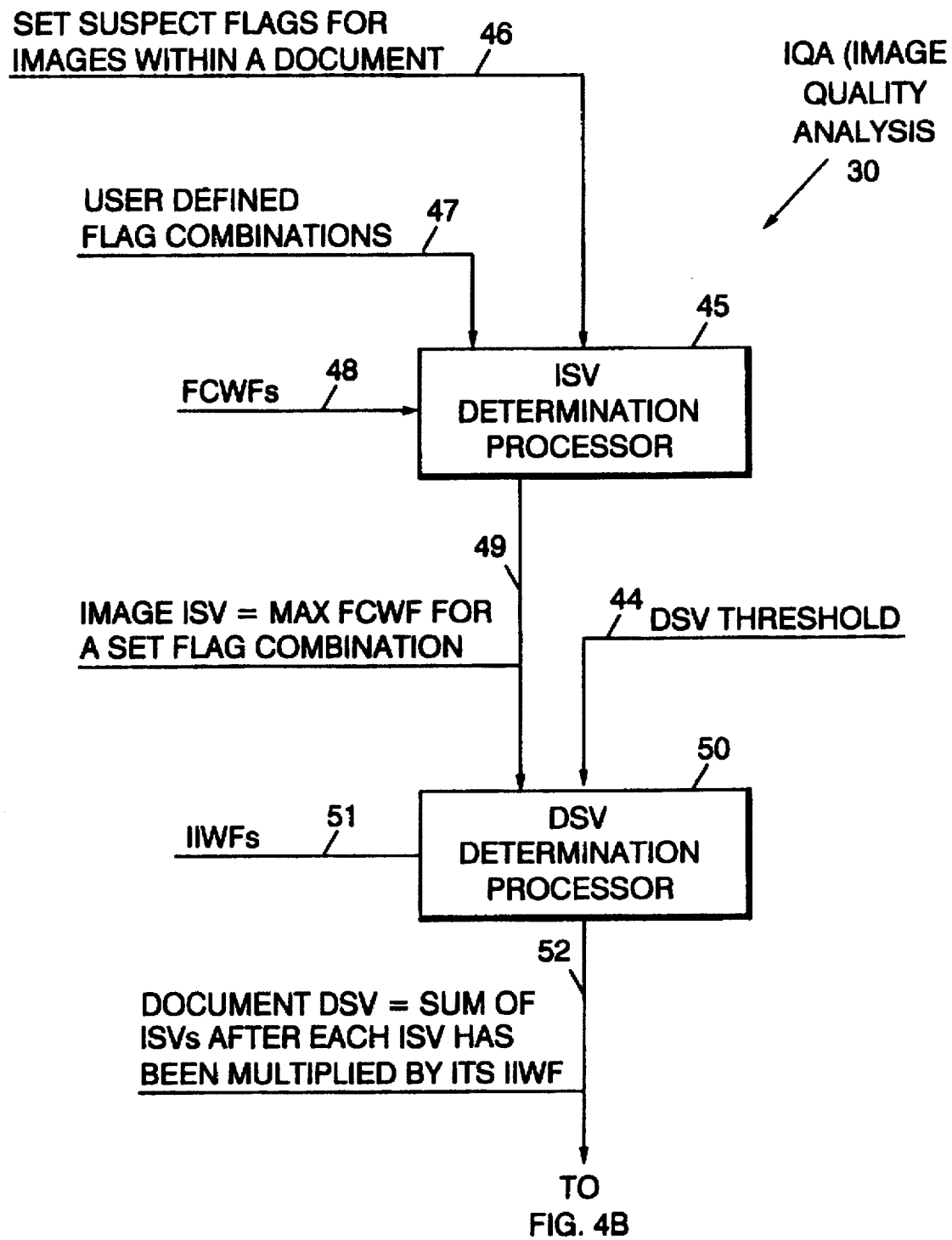
FIG. 4 is a showing of the computation of the ISVs, DSVs and USVs in accordance with the invention.
Figure 4B:
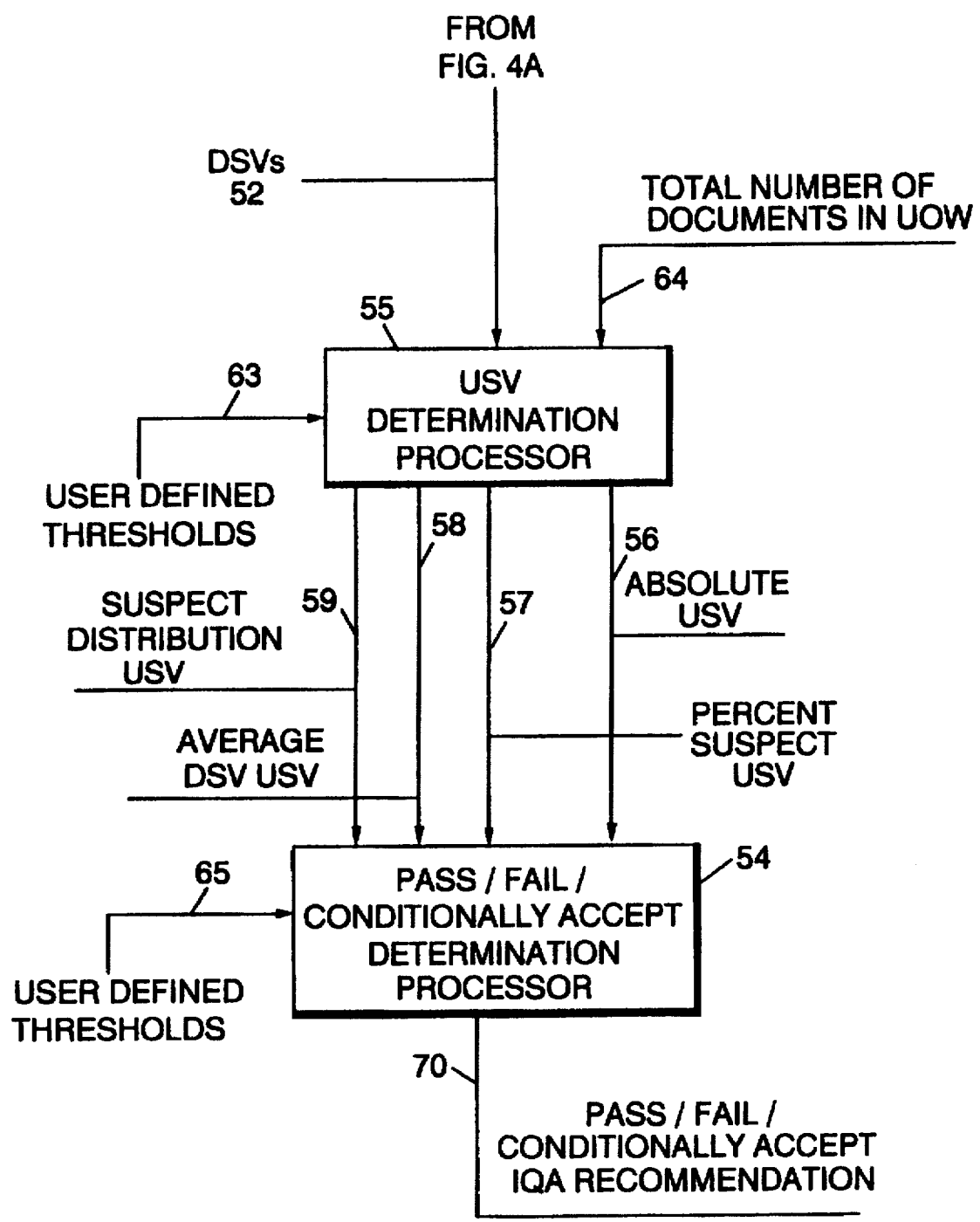

With reference to FIG. 4, the invention operates to order suspect flags and flag combinations by their relative image suspiciousness, thus recognizing that certain flags, and/or flag combinations, are more critical to image quality than are other flags and/or flag combinations. This function is accomplished by user parameters 42 of FIG. 3 which allow the user to specify a Flag Combination Weighting Factor (FCWF) 47 for each flag and/or flag combination.

In FIG. 4, ISV determination processor 45 receives the actual flags set 46 for document images. Processor 45 also receives user defined flags, and/or flag combinations 47 and FCWFs 48 for these user defined flags and/or flag combinations.

As a feature of the invention, processor 45 determines the ISV 49 for an individual image, which ISV 49 comprises the maximum FCWF 48 that has been assigned to a flag or flag combination that has been set for that image.

As a feature of the preferred embodiment, IQA 30 provides default FCWF values 48 for all single flags, and for certain flag combinations by way of user parameters 42.

The DSV 52 for a document is a function of the ISVs of all images that are associated with the suspect document, and the relative importance of a given image of that document. DSV determination processor 50 determines DSV 52 for each individual document of a UofW. DSV determination processor 50 receives the ISVs 49 for all images of the suspect document, and a user defined Image Importance Weighting Factor (IIWF) 51 for each image of the document. As a feature of the invention, but without limitation thereto, DSV 52 for an individual document comprises the summation of the ISVs 49 for the document after the ISVs 49 have been multiplied by their respective IIWFs 51.

The DSVs 52 for all documents in an identified UofW are applied to USV determination processor 55. The USVs for a UofW are based upon the DSVs of the individual documents within the UofW, and the distribution of images having DSVs greater than a DSV threshold value across the total UofW sample.

As a feature of the preferred embodiment, USV determination processor 55 operates to compute four different USV values for a UofW; more specifically, an absolute number of suspects USV value 56, a percent suspect USV value 57, an average DSV USV value 58 and a suspect distribution USV value 59. This computation is based upon a comparison of the DSVs 52 for all documents within the UofW to a set of user defined thresholds 63.

Without limitation thereto, absolute USV 56 is the absolute number of DSVs 52 that are above the specified DSV threshold 44, percent suspect USV 57 is the ratio of the number of DSVs 52 that are above the specified DSV threshold 44 to the total number of documents in the UofW 64, average DSV USV 58 is the average of the DSVs 52 that are above the specified DSV threshold 44, and suspect distribution USV 59 is a measure of the distribution of documents having a DSV 52 that is above the specified DSV threshold 44 across the total number of documents in the UofW 64.

A pass/fail/conditionally accept recommendation 70 for a UofW is made by pass/fail/conditionally accept determination processor 54. This pass/fail/conditionally accept recommendation 70 is made by comparing the set of computed UofW suspiciousness values 56–59 against user defined, or default threshold values 65. If one of the computed UofW suspiciousness values 56–59 exceeds its threshold 65, the UofW is failed (72 on FIG. 3); i.e., it is not archived. If none of the computed USVs 56–59 exceed its threshold 65, the UofW is either passed (71 on FIG. 3), i.e. the user accepts the recommendation of IQA and will proceed to archive the images (78 on FIG. 3) or conditionally accepted (73 on FIG. 3), i.e. IQA has passed the UofW, however the user desires to review (31 on FIG. 3) the images involved to potentially override IQA's recommendation 70.

With reference to FIG. 2, IQR 32 provides detailed and summary information reports, in hard copy form, defining the input to, and the output from, IQA 30 and SIR 31. This information enables both short and long-term trends to be evaluated.

IQR 32 provides both a current run report and a historical report. The current run report relates to the input to IQA 30 and contains, for example, a summary and detailed report about the suspect flags that were generated for all suspect documents of a UofW, the total number of documents in the UofW, and the frequency of individual suspect flag occurrence. Relative to the output from IQA 30, the current run report includes the ISVs for each suspect image, the DSVs for each document having one or more suspect images, and the USVs for each UofW having a document for which a DSV has been generated. In addition, the current run report contains the pass/fail/conditionally accept recommendation for a UofW, and the results of human suspect image review 31.

The historical report that is generated by IQR 32 provides statistical summaries of the current run reports for a specified period of time. Relative to IQA 30 input, the historical report includes the same summary and detailed reporting as exists for the current run reports in addition to the frequency of suspect flag occurrence. Relative to the output from IQA 30, the historical report includes USV, DSV and ISV statistics for the period. In addition, the historical reports include items, such as pass/fail/conditionally accept recommendation statistics for the period, a review of the action of Suspect Image Review 31 for the period, UofW disposition statistics for the period, and detailed information relative to each UofW.

As mentioned, the present invention provides computationally efficient subsets of image suspect flags and flag combinations, or system states, to thus efficiently provide a machine quantitative measure of the quality or degree of suspiciousness of an underlying digital image.

Figure 5:
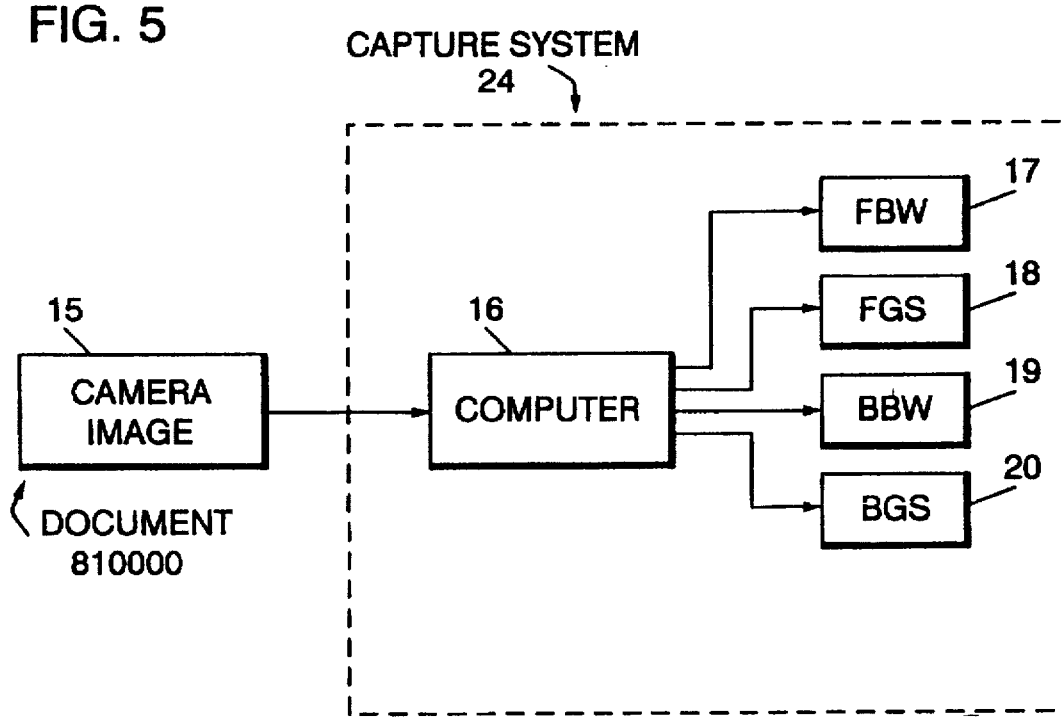
FIG. 5 illustrates how the image capture system of FIG. 2 operates to produce four digital images of a check from two camera images of the check (namely, a front view), black/white image (FBW), a front view, gray scale image (FGS), a back view, black/white image (BBW), and a back view, gray scale image (BGS).

FIGS. 6–9 illustrate examples of operator defined flags and flag combinations by which the ISVs of FBW digital image 17, FGS digital image 18, BBW digital image 19 and BGS digital image 20 of FIG. 5 are machine calculated for check number 810000, this calculation being performed by ISV determination processor 45 of FIG. 4. As used herein, the term flag combination may comprise only one flag, or the combination of a number of flags.

Figure 6:
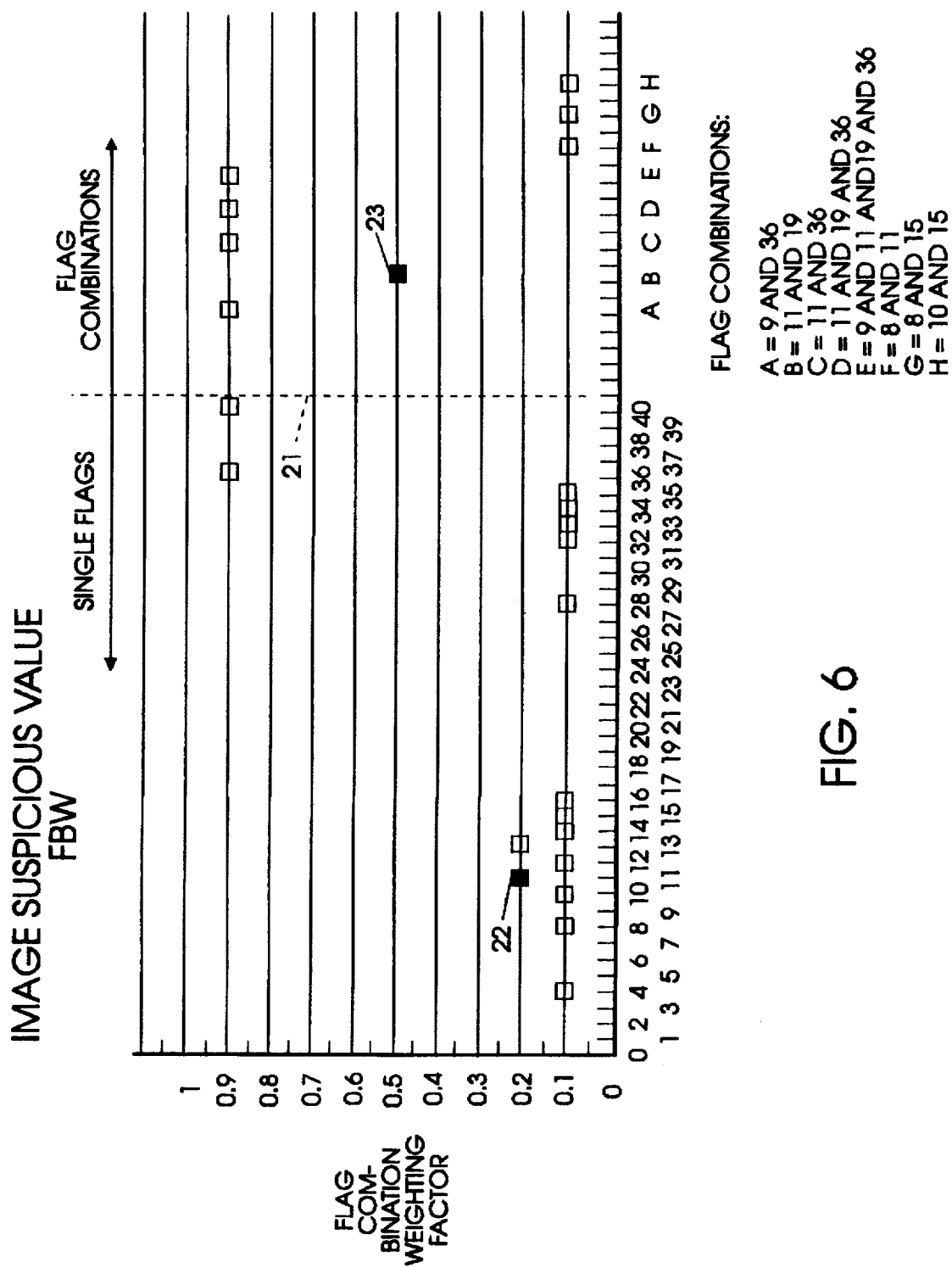
FIGS. 6–9 illustrate examples of operator defined flags and flag combinations by which the Image Suspiciousness Values (ISVs) of the FBW digital image, the FGS digital image, the BBW digital image, and the BGS digital image of FIG. 5 are machine calculated.
Figure 7:
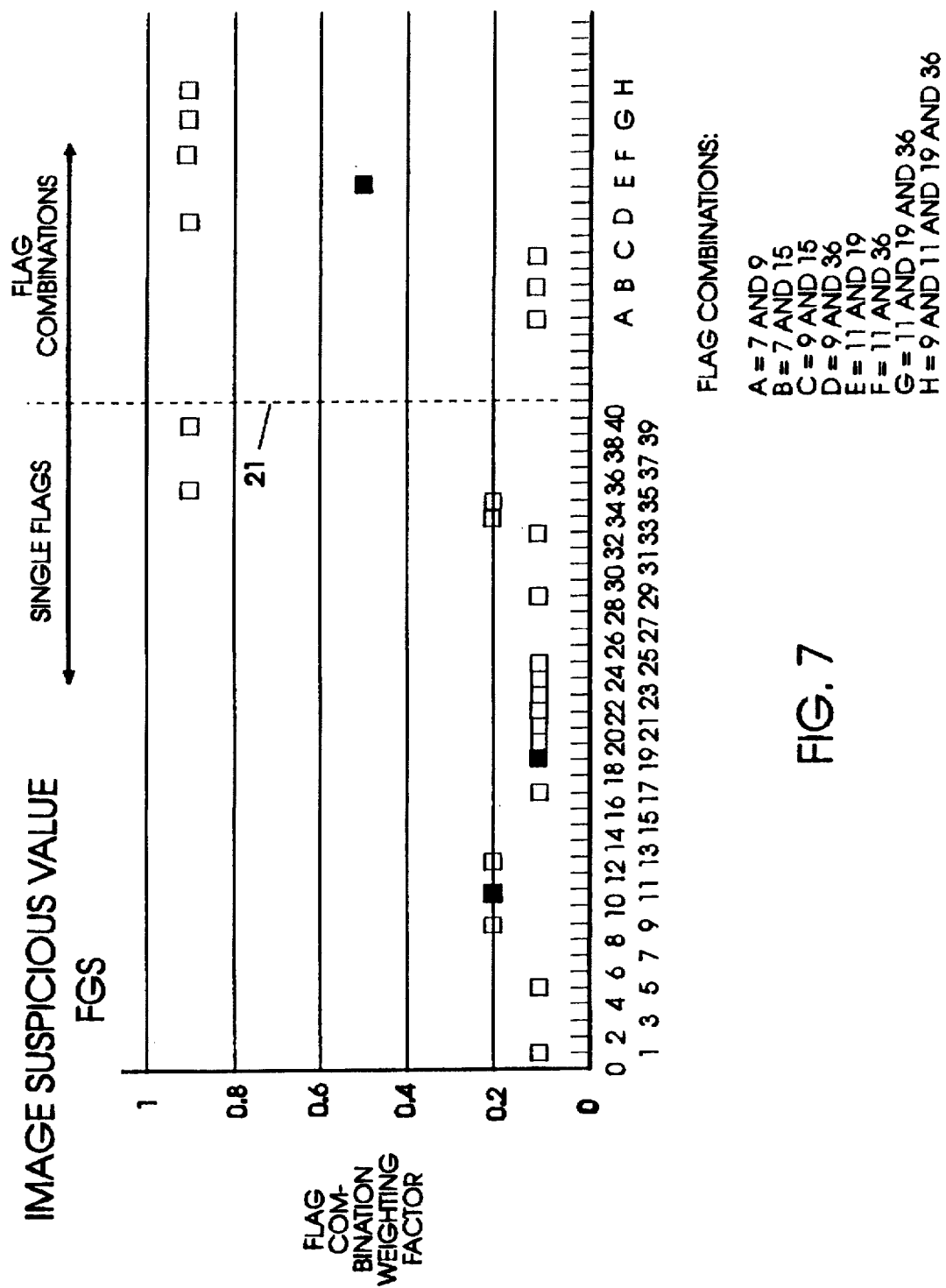
Figure 8:
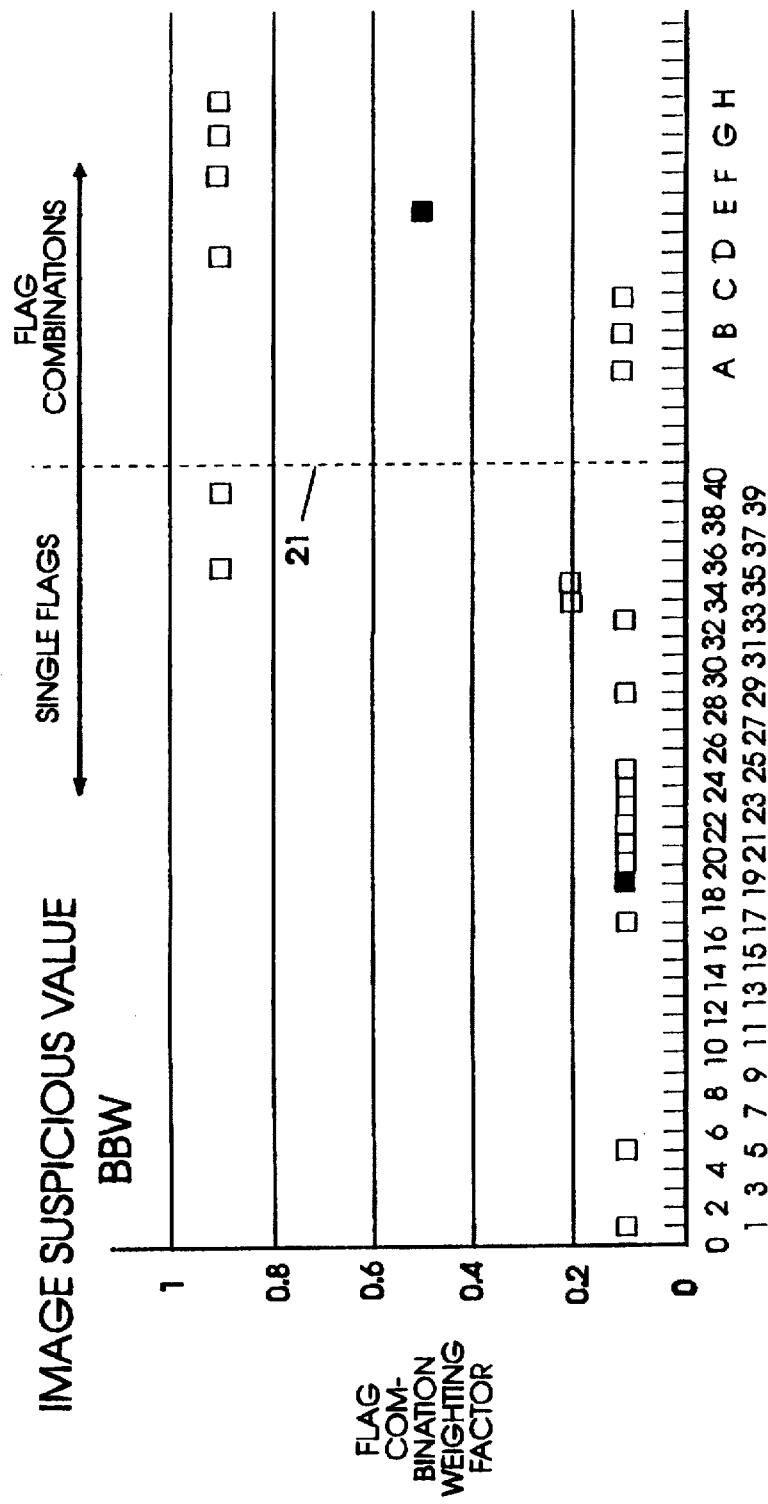
Figure 9:
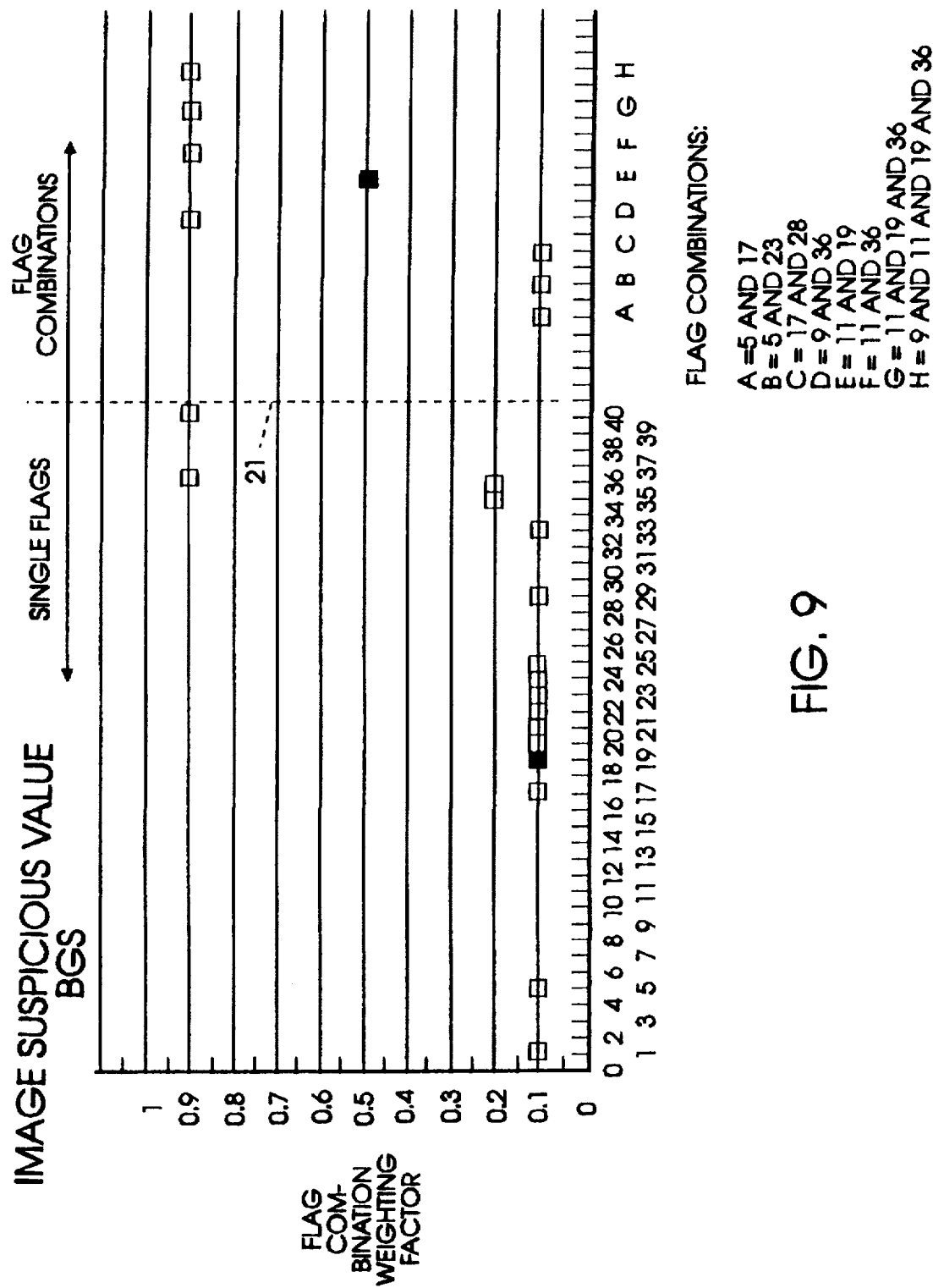

Each of FIGS. 6–9 includes a vertical line 21 that separates operator defined single flags from operator defined flag combinations. While 40 single flags, denoting 40 anomalous conditions that can occur during the image capture process for a check are shown in FIGS. 6–9, the operator has determined that a majority of these flags are don't care flags, or that the flags do not pertain to the particular image; for example, flag 20 of FIG. 6 is a don't care flag for FBW image 17. Other single flags of FIGS. 6–9 have been defined as flags whose set state is a measure of image quality. Thus, in FIG. 6 for example, single flags 4, 8, 10–16, 28, 31–36 and 40 have been defined as critical to image quality for FBW image 17.

As stated previously, some of the flags of FIGS. 6–9 relate to a single image, some are related to all images of a document, and yet others relate to operation of the scanner. As an example, a flag that relates to a single image might be a flag indication that the BGS byte compressed count was under a limit. Each image should compress to a reasonable number of bytes, and a flag is set if it does not.

A flag that relates to all images might, for example, be a flag indicating that an image portion was removed due to channel error. This suspect event might occur on documents having very cluttered backgrounds. When the number of bytes in an image record is above a specified limit, a portion of the image record is deleted to allow successful image transfer to a host computer. Since data is removed from part of the image record, parts of the image may be unusable.

A flag that relates to scanner operation might, for example, be a flag indicating a front scanner parity error. Image data is tagged with parity information at the scanner, and is tested for data integrity by the image capture process. Images with parity errors may not be usable, and flags are set for these documents.

In addition, certain flag combinations have been defined as flag combinations whose set state is a measure of image quality. Thus, in FIG. 8 for example, eight flag combinations identified as A-H have been defined as critical flag combinations for BBW image 19. For example, flag combination A requires that flags 5 and 17 both be set in order for flag combination A to be set, and flag combination H requires that all four flags 9, 11, 19 and 36 be set in order for flag combination H to be set. Note that in the case of flag combination H, flags 9 and 11 are individually don't care flags. The above-mentioned flags and flag combinations comprise input 47 to ISV determination processor 45 of FIG. 4.

The present invention provides that a human operator specify which flags and flag combinations of FIGS. 6–9 shall be used when making a machine determination or computer computation of ISV. The machine interrogates the state of these specified flags and flag combinations to form a quantitative measure of quality and the degree of suspiciousness of the image; i.e., the machine forms a number comprising the ISV of the image. While this example of a machine based imaging system provides 40 image quality flags that can be set during operation of the imaging system and as a check is scanned, a second smaller plurality of flags and flag combinations; i.e., the operator defined flags and flag combinations of FIGS. 6–9 for which an FCWF has been provided, are used to compute an ISV for the digital image as a function of the presence or the set state of one or more of these flags and flag combinations.

The invention provides that the machine based determination of ISV include FCWFs for the flags and flag combinations that have been operator defined. This is illustrated in FIGS. 6–9 by way of the boxes that are arranged vertically above each of the operator defined flags and flag combinations. For example, in FIG. 9, the FCWF value of 0.2 has been assigned to both of flags 35 and 36, and the FCWF value of 0.9 has been assigned to flag combination D. Thus, relatively speaking, flag combination D has been determined by the operator to be more critical to image quality for BGS image 20 than either flag 35 or flag 36. In this way, a FCWF is assigned to each of the operator defined critical flags and flag combinations. The above-mentioned FCWFs comprise input 48 to ISV determination processor 45 of FIG. 4.

The resulting ISV 49 that is calculated by ISV determination processor 45 is based upon a comparison of the set suspect flags and flag combinations to their FCWF. Without limitation thereto, the ISV for each of the four digital images of FIG. 5 will be defined as equal to the FCWF of that image's set flag or flag combination having the highest FCWF, and processor 45 is constructed and arranged to use this definition in performing its calculation of the ISV of each of the four images 17–20 of FIG. 5.

In FIGS. 6–9, the flags and flag combinations that have been set are identified by the associated box being filled in. Thus, as indicated in FIG. 6, the boxes 22 and 23, associated with flag 11 and flag combination B, have been filled in, indicating that flag 11 and flag combination B have been set for FBW digital image 17 of FIG. 5. As a result, the ISV of FBW 17, FIG. 6 is equal to its highest set FCWF; namely, an ISV of 0.5, this being equal to the FCWF of 0.5 that was assigned to flag combination B, as shown by box 23. In like fashion, the ISV of FGS image 18 of FIG. 5 is found to be established by set flag combination E of FIG. 7 and is equal to 0.5, the ISV of BBW image 19 of FIG. 5 is found to be established by set flag combination E of FIG. 7 and is equal to 0.5, and the ISV of BGS image 20 of FIG. 5 is found to be established by set flag combination E of FIG. 7 and is equal to 0.5.

These four ISVs are presented as an input 49 to DSV determination processor 50 in FIG. 4. A second input to processor 50 is the IIWF 51 for each of these four digital images. As will be remembered, these IIWF values are specified by the operator as a portion of the user parameters 42 shown in FIG. 3. For purpose of explanation, and without limitation thereto, it will be assumed that the three images 17–19 of FIG. 5 are of equal importance to document quality and that the IIWF of these three images is set to the value 1.0 by the operator or user. Relative to BGS image 20, it will be assumed that this image is of no importance to document quality and that the IIWF of image 20 is, accordingly, set to be equal to 0.0.

FIG. 10 illustrates the operation of DSV determination processor 50 of FIG. 4. Processor 50 receives three inputs; namely, IIWF inputs 51 for each of the four digital images 17–20, a DSV threshold value 44 that is used to determine the acceptability of the document that corresponds to the four digital images 17–20, and the ISV inputs 49 that were calculated by processor 45 for each of the four images 17–20.

As shown in FIG. 10, the DSV of document 810000 is computed as the summation of the IIWF of each individual one of the digital images 17–20 multiplied by that image's ISV. In this illustrative case, the DSV equals the value 1.5.

In FIG. 10, the value 1.5 is plotted and compared to a DSV threshold of 0.3. Based upon this comparison, document 810000 is found to be of unacceptable quality; i.e., the quality of camera image 15 and/or digital images 17–19 are suspect, it being remembered that digital image 20 is a don't care image in this example.

Since document 810000 has been machine classified as a suspect document of unacceptable quality, it will be included in the USV calculations. Depending on how strict or lenient the user defined USV thresholds 63 have been set, the IQA recommendation 70 of FIG. 3 for the UofW containing document 810000 may still be pass, fail or conditionally accept. In the latter two cases, suspect review 31 will be invoked to convert digital images 17–20 to visual images for operator review 31. The result of human suspect review 31 can be accept 74 or to reject 75. Should the operator determine that the images of the suspect documents are, in fact, acceptable, then the operator would likely adjust user parameters 42 in order to teach processors 45 and 50 of FIG. 4 to more accurately calculate the DSV illustrated in FIG. 10.

A UofW comprises a large number of documents, such as above-mentioned document 810000 which was found to be suspect in FIG. 10. As shown in FIG. 4, the DSV 52 for each document within the UofW is provided as one input to USV determination processor 55. Other inputs to processor 55 are the total number of documents in the UofW 64, and user defined USV thresholds 63. From these three inputs, processor 55 operates to calculate an absolute USV 56, a percent suspect USV 57, an average DSV USV 58, and a suspect distribution USV 59.

Figure 11:
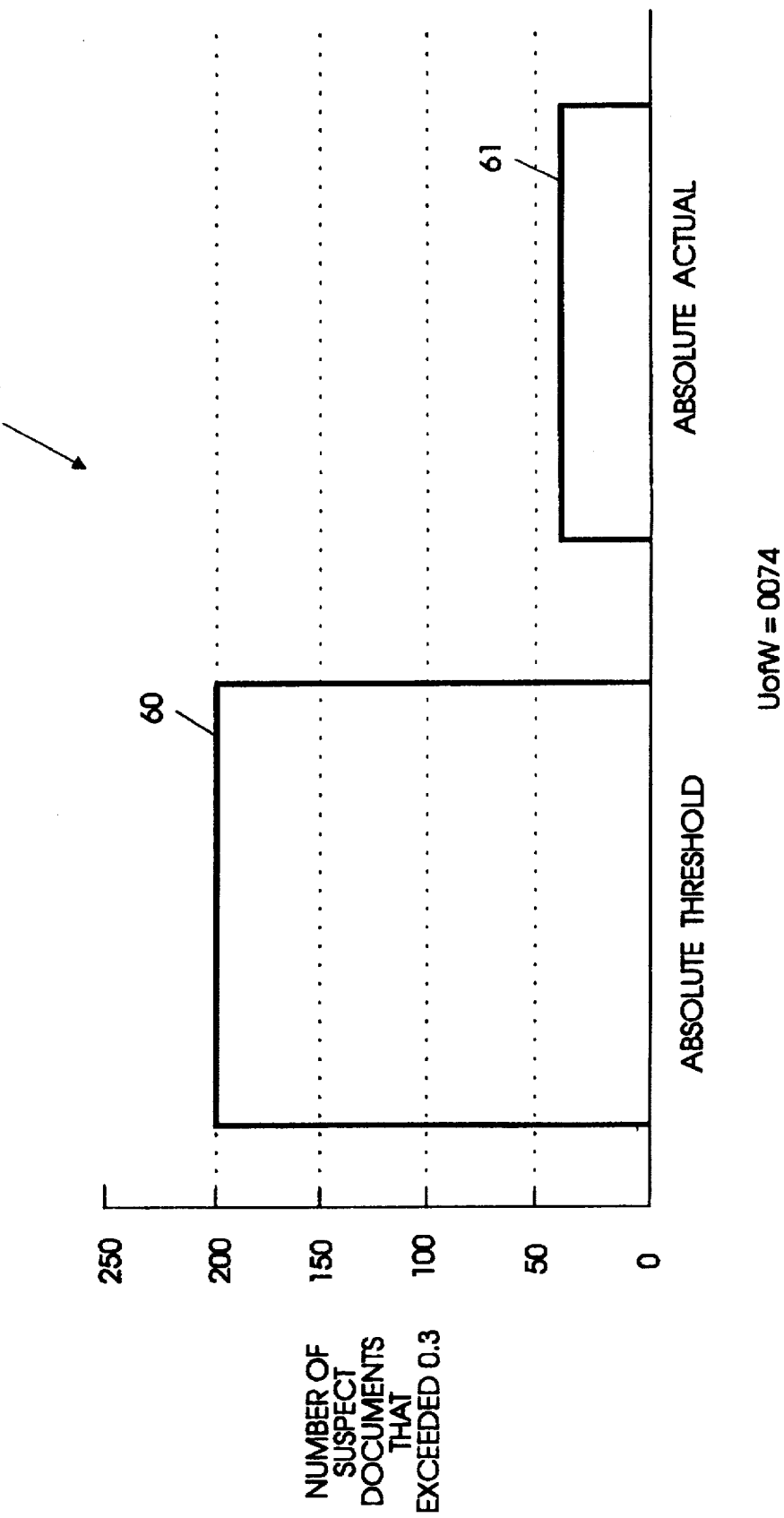

FIG. 11 illustrates the manner in which USV determination processor 55 of FIG. 4 calculates the absolute USV for a UofW, and provides this determination to its output 56. In this illustration, the UofW is arbitrarily identified as UofW number 0074. The user has defined that the absolute threshold 60 for determining the absolute USV for UofW 0074 shall be the value 200, (i.e., so long as UofW 0074 contains no more than 200 documents whose individual DSVs exceed the threshold value 0.3 shown in FIG. 10, UofW 0074 will be found to be acceptable for archive). In this illustration, the actual number of documents that exceeded the 0.3 threshold 61 is slightly less than 50. Thus, UofW 0074 passes the absolute USV quality test.

FIG. 12 illustrates the manner in which USV determination processor 55 of FIG. 4 calculates the percent suspect USV for UofW 0074, and provides this determination to its output 57. Here the user has defined that the percent suspect threshold 62 for determining the percent suspect USV shall be the value 0.50 (i.e., so long as UofW 0074 contains no more than 0.50 percent documents whose individual DSVs exceed the DSV threshold value 0.3 shown in FIG. 10, UofW 0074 will be found to be acceptable for archive). In this illustration, the actual percentage of documents that exceeded the 0.3 DSV threshold 66 is 0.11, meaning that the percent of good documents in UofW 0074 is 99.89 percent. Thus, UofW 0074 passes the percent suspect USV quality test.

Figure 13:
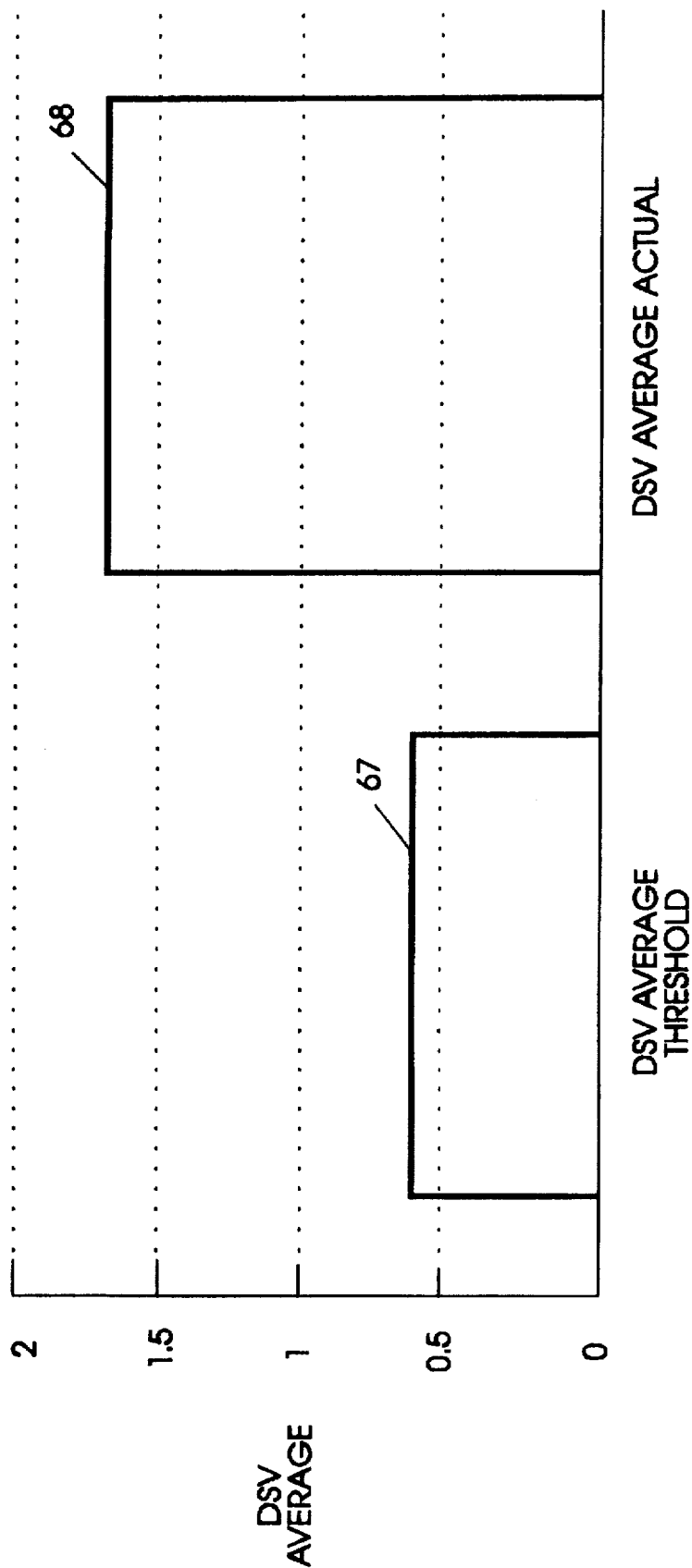

FIG. 13 illustrates the manner in which USV determination processor 55 of FIG. 4 calculates the average DSV USV for UofW 0074 and provides this determination to its output 58. Here the user has defined that the average DSV USV threshold 67 for determining the average DSV USV shall be the value 0.7 (i.e., so long as the average DSV of all documents of UofW 0074 that exceeded the DSV threshold of 0.3 is less than 0.7, UofW 0074 will be found to be acceptable for archive). In this illustration, the actual average DSV for the documents of UofW 0074 that exceeded the 0.3 DSV threshold 68 equalled about 1.7. Thus, UofW 0074 failed to pass the average DSV USV quality test.

Figure 14:
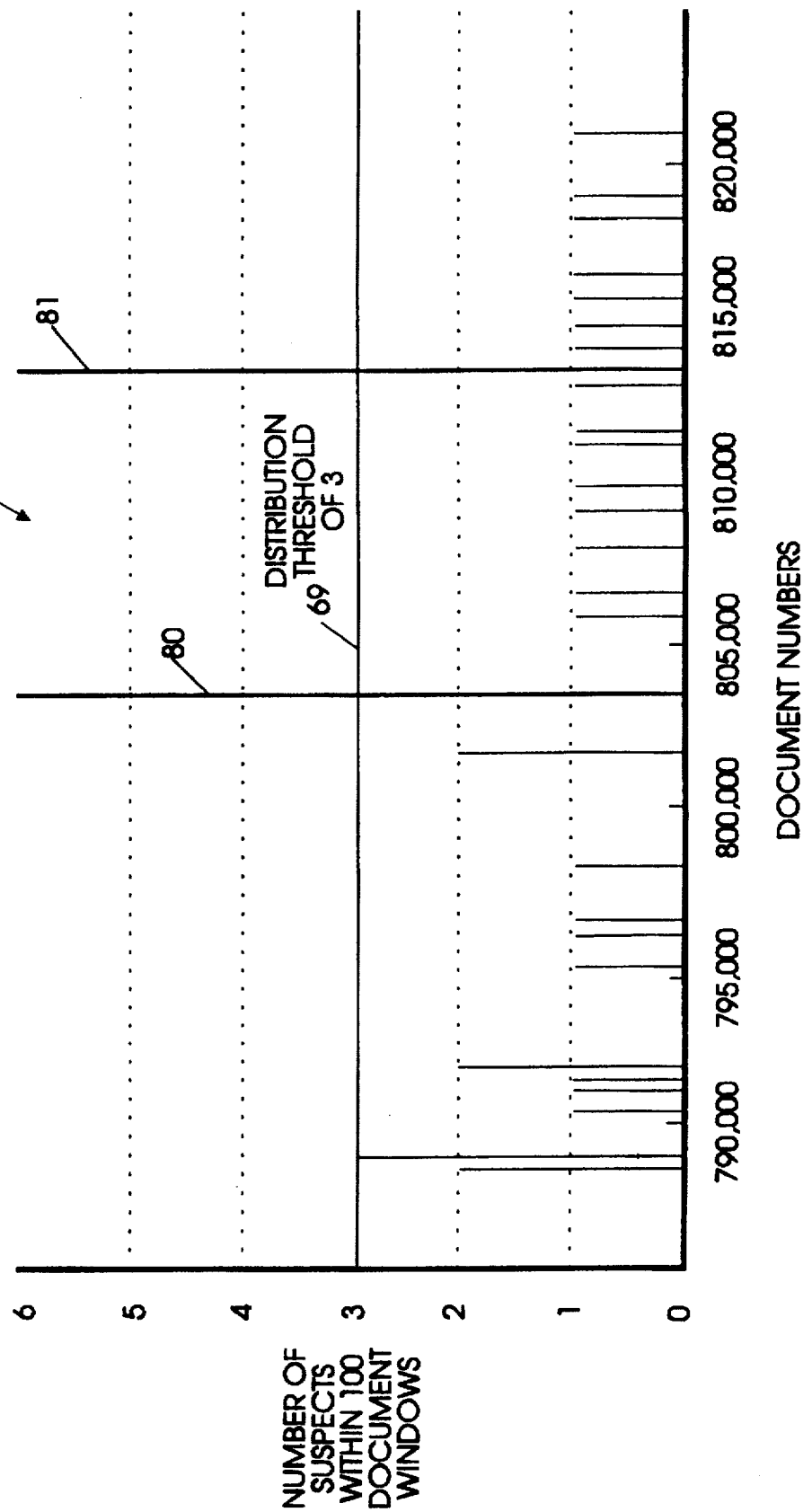

FIG. 14 illustrates the manner in which USV determination processor 55 of FIG. 4 calculates the suspect distribution USV for UofW number 0074, and provides this determination to its output 59. Here the user has defined that the suspect distribution threshold 69 for determining the suspect distribution USV shall be the value 3 (i.e., so long as no more than 3 documents in a moving window comprising a user defined number of documents (for example 100 documents) within UofW 0074 exceed the DSV threshold of 0.3, UofW 0074 will be found to be acceptable for archive). In this illustration, the moving window found the suspect distribution threshold 69 to be exceeded twice within UofW 0074; namely, at 80 and at 81. Thus, UofW 0074 failed to pass the suspect distribution USV quality test.

In view of the failure of UofW 0074 to pass the average DSV USV quality test, illustrated in FIG. 13, and the suspect distribution USV quality test illustrated in FIG. 14, the pass/fail/conditionally accept determination processor 54 of FIG. 4 operates to provide a fail decision at its output 53 relative to UofW 0074.

From the above-detailed description it can be seen that the present invention provides a predefined set of image quality flags and flag combinations as shown, for example, in FIGS. 6–9. These set flags from this group of flags and flag combinations is then analyzed, as shown in FIG. 4 to provide ISVs. As shown in FIG. 10, the apparatus of FIG. 4 uses these ISVs to compute a DSV for each document of a UofW. Finally, the apparatus of FIG. 4 uses these DSVs to calculate four unique USVs, as shown in FIGS. 11–14.

While the invention has been described while making reference to preferred embodiments thereof, it is recognized that those skilled in the art will readily visualize yet other embodiments that are within the spirit and scope of the invention. Thus it is intended that the above detailed description not be taken as a limitation on the invention.

What is claimed is:

1. Apparatus for use with a machine based imaging system that is operable to scan a plurality of documents within a unit of work, and provides a plurality of images corresponding to each of said documents, said imaging system including means whereby a plurality of anomalous condition flags are set during operation of said imaging system, said apparatus operating to provide a quantitative measure of success of the operation of said imaging system, said apparatus comprising;

a first processor operable to determine a numerical image suspiciousness value for each of said plurality of images corresponding to each of said documents, and having an output containing said image suspiciousness values for each of said plurality of images corresponding to each of said documents, a first input to said first processor whereby the importance of each of said flags to image quality of said images is ranked by a flag weighting factor for each of said plurality of images, a second input to said first processor defining which of said flags are set for each of said documents, a second processor operable to determine a numerical document suspiciousness value for each of said documents, and having an output containing said document suspiciousness values, a first input to said second processor connected to said output of said first processor, a second input to said second processor whereby the importance of each of said images is ranked by an image weighting factor, a third processor for determining a numerical unit of work suspiciousness value and having an output containing said unit of work suspiciousness value, a first input to said third processor connected to the output of said second processor, and a second input to said third processor defining values by which said third processor determines whether or not said unit of work is acceptable.

2. A method of making an machine-based accept-decision or reject-decision for a unit-of-work that comprises a plurality of documents that are scanned by operation of a machine-based-imaging-system, wherein said machine-based-imaging-system includes means whereby a plurality of anomalous-condition-indicators are set during operation of said machine-based-imaging-system, and wherein said each of said documents within said unit-of-work includes a plurality of images, the method comprising the steps of;

defining weighting-factors for said plurality of anomalous-condition-indicators, without interrupting operation of said machine-based-imaging-system, determining an image-suspiciousness-value for each of said images within each of said plurality of documents, said image-suspiciousness-values being a function of said defined weighting-factors, and being a function of specific ones of said anomalous-condition-indicators that are set, defining an image-weighting-factor for each of said images, determining a document-suspiciousness-value for each of said plurality of documents, said document-suspiciousness-values being a function of said determined image-suspiciousness-values, and being a function of said defined image-weighting-factors, determining a unit-of-work suspiciousness-value based upon document-suspiciousness-values for said plurality of documents, and making said accept-decision or said reject-decision for said unit-of-work based upon said unit-of-work suspiciousness-value.

3. A method for machine-determining a unit-of-work suspiciousness-value that is based upon a machine-determination of the quality of digital images of documents that are within said unit-of-work, comprising the steps of;

forming a unit-of-work that comprises a plurality of documents, providing a document-scanning-machine, said scanning-machine operating to originate a plurality of anomalous-condition-indicators that are individually indicative of anomalous conditions that relate to operation of said scanning-machine, defining indicator-importance-weighting-factors to individually rank the importance of each of said plurality of condition-indicators, using said scanning-machine to scan each document of said unit-of-work, and forming digital images corresponding to each document of said unit-of-work, machine-determining an image-suspiciousness-value for each of said digital images based upon said indicator-weighting-factors, and based upon which of said plurality of condition-indicators are set, defining image-importance-weighting-factors to individually rank the importance of each of said digital images, machine-determining a document-suspiciousness-value for each of said documents within said unit-of-work based upon said image-importance-weighting-factors and based upon said determined image-suspiciousness-values, and machine-determining a unit-of-work suspiciousness-value based upon said determined document-suspiciousness-values for each of said documents within said unit-of-work.

* * * * *